(12) United States Patent
Aoyama

(10) Patent No.: US 9,838,752 B2
(45) Date of Patent: Dec. 5, 2017

(54) ADVERTISEMENT DISTRIBUTION SYSTEM

(75) Inventor: Koji Aoyama, Kanagawa (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 3257 days.

(21) Appl. No.: 10/952,776

(22) Filed: Sep. 30, 2004

(65) Prior Publication Data

US 2005/0114526 A1 May 26, 2005

(30) Foreign Application Priority Data

Sep. 30, 2003 (JP) .............................. P2003-341969

(51) Int. Cl.
H04N 21/81 (2011.01)
A63F 13/61 (2014.01)
A63F 13/30 (2014.01)
G06Q 30/02 (2012.01)
H04N 7/16 (2011.01)
(Continued)

(52) U.S. Cl.
CPC ........... H04N 21/812 (2013.01); A63F 13/12 (2013.01); A63F 13/61 (2014.09); G06Q 30/02 (2013.01); H04N 7/165 (2013.01); H04N 7/17336 (2013.01); H04N 21/25808 (2013.01); H04N 21/25866 (2013.01); H04N 21/4788 (2013.01); A63F 2300/402 (2013.01); A63F 2300/407 (2013.01); A63F 2300/50 (2013.01);
(Continued)

(58) Field of Classification Search
USPC .... 705/14, 14.58, 14.49; 463/40, 41, 42, 43; 709/228
See application file for complete search history.

(56) References Cited

U.S. PATENT DOCUMENTS 6,606,644 B1 * 8/2003 Ford ................. G06F 17/30864
707/999.003
6,834,195 B2 * 12/2004 Brandenberg ............ G01S 5/02
340/539.11
(Continued)

FOREIGN PATENT DOCUMENTS

EP 1267532 A2 * 12/2002 ............. H04L 12/58
JP 11-312190 11/1999
(Continued)

OTHER PUBLICATIONS

English language Abstract of JP 2002-157204.
(Continued)

Primary Examiner — John Van Bramer
(74) Attorney, Agent, or Firm — Greenblum & Bernstein, P.L.C.

(57) ABSTRACT

Effective advertisements are provided to users of a network. On a terminal of a user B, user names of users whom the user B registered in advance as friends are displayed. On the terminal, information indicating whether respective friend users are online or offline, is also displayed. Icons representing video games, etc., played by the friend users are also displayed on the terminal. When the user B clicks the icon of the Game C associated with the user A, the terminal executes advertisement information display processing. By this processing, an advertisement information screen is displayed on the terminal. On the advertisement information screen, an advertisement relating to the status of the user A registered as the friend is displayed.

32 Claims, 17 Drawing Sheets

(51) Int. Cl.
*H04N 7/173* (2011.01)
*H04N 21/258* (2011.01)
*H04N 21/4788* (2011.01)

(52) U.S. Cl.
CPC ............... *A63F 2300/5506* (2013.01); *A63F 2300/5546* (2013.01)

(56) References Cited

U.S. PATENT DOCUMENTS

| | | | |
|---|---|---|---|
| 6,842,460 B1* | 1/2005 | Olkkonen | H04W 48/16 370/328 |
| 7,099,831 B2* | 8/2006 | Mitsuoka | G06Q 30/02 705/14.39 |
| 7,116,985 B2* | 10/2006 | Wilson | H04W 64/00 455/456.1 |
| 7,234,116 B2* | 6/2007 | Watanabe | G06Q 10/107 715/752 |
| 2002/0029162 A1 | 3/2002 | Mascarenhas | |
| 2002/0120503 A1 | 8/2002 | Iwayama et al. | |
| 2002/0133493 A1 | 9/2002 | Mascarenhas | |
| 2003/0009549 A1* | 1/2003 | Maehiro | A63F 13/12 709/223 |
| 2003/0009762 A1 | 1/2003 | Hooper et al. | |
| 2003/0014428 A1 | 1/2003 | Mascarenhas | |
| 2003/0078840 A1 | 4/2003 | Strunk et al. | |
| 2003/0195801 A1* | 10/2003 | Takakura | G06Q 30/02 705/14.66 |
| 2003/0216958 A1* | 11/2003 | Register | G06Q 30/02 705/14.61 |
| 2004/0171381 A1* | 9/2004 | Inselberg | H04H 20/38 455/426.2 |

FOREIGN PATENT DOCUMENTS

| | | |
|---|---|---|
| JP | 2002-074164 | 3/2002 |
| JP | 2002-157204 | 5/2002 |
| JP | 2002-304347 | 10/2002 |
| JP | 2002-324048 | 11/2002 |
| JP | 2002-342362 | 11/2002 |
| JP | 2003-022228 | 1/2003 |
| JP | 2003-047776 | 2/2003 |
| WO | 01/73642 | 10/2001 |

OTHER PUBLICATIONS

English language Abstract of JP 2002-324048.
English language Abstract of JP 2003-047776.
English language Abstract of JP2003-022228.
English Language Abstract of JP 2002-304347.
English Language Abstract of JP 2002-074164.
English Language Abstract of JP 11-312190.
English Language Abstract of JP 2002-342362.

* cited by examiner

FIG. 1
PRIOR ART

| Name | Status |
|---|---|
| Mary | Online |
| Taro Yamada | |
| Hanako | Online |
| John | Online |

FIG. 2
PRIOR ART

| Name | Status | Icon |
|---|---|---|
| Mary | Online | Game A |
| Taro Yamada | | |
| Hanako | Online | Game B |
| John | Online | Game A |

FIG. 7

| STATUS ID | STATUS NAME | ICON IMAGE NAME | ADVERTISING URL | AGE LIMIT | EXPIRATION DATE | PRIORITY |
|---|---|---|---|---|---|---|
| 0001 | GAME A | gamea.png | www.gamea.com | NO LIMIT | 2003/10/31 | 100 |
| 0002 | GAME B | gameb.png | www.gameb.com | MORE THAN 10 | 2003/9/30 | 1000 |
| 0003 | GAME C | gamec.png | www.gamec.com | NO LIMIT | 2004/4/30 | 150 |
| 0004 | AA LAND | landaa.png | www.landaa.com | NO LIMIT | 2003/9/30 | 500 |
| 0005 | BB AMUSEMENT PARK | parkbb.png | www.parkbb.com | NO LIMIT | 2003/9/30 | 600 |
| 0006 | MOVIE "CC" | chinemacc.png | www.chinemacc.com | LESS THAN 15 | 2003/12/31 | 200 |

| TERM | AUG, 2003 | SEP, 2003 | .... |
|---|---|---|---|
| USER NAME | USER A | USER A | .... |
| STATUS ID | 0001 | 0001 | .... |
| ABSENCE OR PRESENCE OF STATUS SETTING | 1 | 1 | .... |
| ABSENCE OR PRESENCE OF STATUS RECEPTION | 0 | 0 | .... |
| ABSENCE OR PRESENCE OF STATUS DISPLAY | 0 | 0 | .... |
| STATUS ID | 0002 | 0002 | .... |
| ABSENCE OR PRESENCE OF STATUS SETTING | 0 | 1 | .... |
| ABSENCE OR PRESENCE OF STATUS RECEPTION | 1 | 0 | .... |
| ABSENCE OR PRESENCE OF STATUS DISPLAY | 1 | 0 | .... |
| ⋮ | ⋮ | ⋮ | ⋮ |
| USER NAME | USER B | USER B | .... |
| STATUS ID | 0001 | 0001 | .... |
| ABSENCE OR PRESENCE OF STATUS SETTING | 1 | 1 | .... |
| ABSENCE OR PRESENCE OF STATUS RECEPTION | 1 | 0 | .... |
| ABSENCE OR PRESENCE OF STATUS DISPLAY | 1 | 0 | .... |
| ⋮ | ⋮ | ⋮ | ⋮ |
| STATUS ID | 0001 | 0001 | .... |
| TOTAL NUMBER OF STATUS SETTING | 1500 | 2000 | .... |
| TOTAL NUMBER OF STATUS RECEPTION | 3400 | 2000 | .... |
| TOTAL NUMBER OF STATUS DISPLAY | 600 | 100 | .... |
| ⋮ | ⋮ | ⋮ | ⋮ |

FIG. 16

| Status Name | Select Status |
|---|---|
| ▶ GAME B | Game B |
| BB Amusement Park | BB Amusement Park |
| AA Land | AA Land |
| Movie "CC" | Movie "CC" |
| Game C | Game C |
| Game A | Game A |

23 (1A)

ADVERTISEMENT DISTRIBUTION SYSTEM

CROSS REFERENCE TO RELATED APPLICATION

The present disclosure relates to subject matter contained in Japanese Patent Application No. 2003-341969, filed on Sep. 30, 2003, the disclosure of which is expressly incorporated herein by reference in its entirety.

BACKGROUND OF THE INVENTION

1. Field of the Invention

The present invention relates to an advertisement distribution system. Furthermore, the present invention relates to an advertisement distribution server and a recording medium on which is recorded an advertisement distribution program.

2. Description of the Related Art

A network system is known, which displays information indicating whether a user who is registered in advance as a friend is online. This system includes a server and multiple user terminals connected to the server via a network. A user registers another user in his/her own terminal as his/her friends in advance. When the user connects his/her terminal to the server while the terminal of the other user is connected to the server, a message of "ONLINE" is displayed in association with the friend "Mary" as shown in FIG. 1. Accordingly, when the user registers multiple other users as his/her friends, the user can know whether each of the friends is online as shown in FIG. 1.

Furthermore, as shown in FIG. 2, a system is known, which displays an icon indicating a video game that the registered friends are playing, as well as information indicating whether the friends are online. Such systems are disclosed, for example, in Japanese Unexamined Patent Publication Nos. 2002-157204, 2002-324048, 2003-47776 and 2003-22228.

However, the network systems as described above only display the status of the registered friends and do not have advertising functions. Furthermore, the use of the network is now widespread, and the advertisement distribution over the network is not novel. In addition, when distributing advertisements over the network, the advertisements are distributed not to a specific person but to the general public, and such advertisements have little effect.

SUMMARY OF THE INVENTION

The present invention is made in view of these problems. It is an object of the present invention to provide an advertisement distribution system, an advertisement distribution server and a recording medium with an advertisement distribution program recorded thereon, which realize an effective advertisement for users on a network.

In order to achieve the object, according to a first aspect of the invention, there is provided an advertisement distributing system having a server and multiple terminals connected to the server via a network. A first terminal of the user includes a first transmitting system that transmits information indicating a status of the user.

The server includes a user relationship storage that stores the user in association with another user. The server further includes an advertisement information storage that stores advertisement information based upon a status of the user. The server further includes a first receiving system that receives information indicating the status of the user from the first terminal. The server further includes a detecting system that detects, in the advertisement information storage, the advertisement information corresponding to the status of the user indicated by the received information. The server further includes a second transmitting system that transmits the detected advertisement information to a second terminal of the other user stored in the user relationship storage.

The second terminal of the other user includes a second receiving system and a displaying system. The second receiving system receives the advertisement information from the server. The displaying system displays the advertisement information received by the second receiving system.

In an example, a user A uses a certain terminal and a user B uses another terminal. When the terminal of user A sends information indicating the status of user A to the server, the server sends advertisement information corresponding to the status of user A to the terminal of user B, who is stored in the server as being associated with user A. Then, advertisement information sent from the server is displayed on the terminal of user B. In this case, user B is stored in the server in association with user A in advance. That is, user B is specified as having a relationship with user A. Thus, the advertising information corresponding to the status of user A, who is a specific known person to user B, is displayed. Therefore, user B is likely to be interested in the advertisement, and the advertisement will be effective.

Furthermore, the second transmitting system transmits the information indicating the status of the user together with the advertisement information. In this case, the second receiving system receives the information indicating the status of the user together with the advertisement information, and the displaying system displays the advertisement information together with the status of the user based upon the information received by the second receiving system. Accordingly, the status of user A is displayed on the terminal of user B together with the advertisement information corresponding to the status of user A, and the advertising effectiveness will be increased.

In another embodiment, the first transmitting system further transmits designation information designating the other user to be associated with the user. The first receiving system further receives the designation information, and the user relationship storage stores the user in association with the other user based upon the designation information. Thus, the terminal of user B designated by user A is registered in the server.

In yet another embodiment, the user relationship storage stores the user in association with multiple other users. In this case, the second transmitting system transmits to each of the other associated terminals stored in the user relationship storage. The advertisement in which each user is likely to be interested will be provided to multiple terminals.

Furthermore, the information indicating the status of the user includes information indicating a video game executed by the terminal of the user. Consequently, the advertising effectiveness of the video game will increase.

In still another embodiment, the first terminal further includes a detecting system that detects an execution status of software executed by the first terminal of the user. The first transmitting system transmits the execution status as the information indicating the status of the user. Thus, the information indicating the status of the user is detected on the software executed by the terminal of user A and transmitted.

In another embodiment, the user relationship storage stores evaluation information of the status of the user. The second transmitting system transmits the evaluation information together with the information indicating the status of the user. The second receiving system further receives the evaluation information, and the displaying system then displays an evaluation corresponding to the evaluation information. User B becomes willing to buy the advertised product when he/she sees the evaluation information.

Furthermore, the advertisement information storage stores pieces of advertisement information together with a priority for each of the pieces of advertising information. The second transmitting system transmits the advertisement information so that the pieces of advertisement information are displayed on the second terminal in an order of the priority. Thus, the advertisement information is displayed on the terminal of user B in an order of the priority.

In another embodiment, the first terminal further includes a designation system that designates the status of the user. In this case, the first transmitting system transmits the information indicating the status of the user designated by the designation system. Thus, the status of the user is easily transmitted from the terminal.

Furthermore, the first receiving system receives the information indicating the designated status of the user from the second receiving system. The second transmitting system transmits the information indicating the designated status of the user. The second receiving system receives the information indicating the designated status of the user, and the displaying system displays the received information. The second terminal of the other user further includes a selecting system that selects any one of the statuses of the user displayed by the displaying system. Accordingly, on the terminal of user B, the advertisement information, which the user B selects is displayed. Thus, an effective advertising display is realized.

In yet another embodiment, the first terminal further includes a detecting system that detects a start and/or end of a video game of a video game program executed by the first terminal. The first transmitting system transmits the start and/or the end of the video game detected by the detecting system as the information indicating the status of the user. Thus, the information indicating the status of the user is sent using the game program effectively.

Furthermore, the advertisement information storage stores the advertisement information together with expiration date information. The detecting system of the server further detects the advertisement information based upon the expiration date information. Thus, the advertisements are managed in the server in view of time limits.

Furthermore, the advertisement information storage may store the advertisement information together with age limit information. The detecting system of the server further detects the advertisement information based upon the age limit information. Thus, the advertisements sent to the user are restricted in the server based upon the age of the user, and effective advertisement transmission is realized.

The server may also include a counting system that counts a number of times the server receives the information indicating the status of the user and/or a number of times the server transmits the advertisement information. Thus, accounting and the like on the basis of the number of processing times counted by the counting system are realized.

According to a second aspect of the invention, there is provided an advertisement distributing server used in an advertisement distributing system. The server is connected to multiple terminals via a network. The server includes a user relationship storage that stores a user in association with another user. The server further includes an advertisement information storage that stores advertisement information based upon a status of the user. The server further includes a receiving system that receives information indicating the status of the user from a first terminal of the user. The server further includes a detecting system that detects, in the advertisement information storage, the advertisement information corresponding to the status of the user indicated by the received information. The server further includes a transmitting system that transmits the detected advertisement information to a second terminal of the other user stored in the user relationship storage.

In one embodiment, the transmitting system transmits the information indicating the status of the user together with the advertisement information.

In another embodiment, the receiving system further receives designation information designating the other user to be associated with the user from the first terminal. The user relationship storage stores the user in association with the other user based upon the designation information.

Furthermore, the user relationship storage stores the user in association with multiple other users. The transmitting system executes transmission to each other terminal stored in the user relationship storage that is associated with the terminal.

The information indicating the status of the user includes information indicating a video game executed by the first terminal of the user.

In another embodiment, the user relationship storage further stores evaluation information of the status of the user. The transmitting system transmits the evaluation information together with the information indicating the status of the user.

Furthermore, the advertisement information storage stores multiple pieces of advertisement information together with a priority for each of the pieces of the advertising information. The transmitting system transmits the advertisement information so that the pieces of advertisement information are displayed on the second terminal in priority order.

Furthermore, the advertisement information storage stores the advertisement information together with expiration date information. The detecting system further detects the advertisement information based upon the expiration date information.

Furthermore, the advertisement information storage stores the advertisement information together with age limit information of the advertisement information. The detecting system further detects the advertisement information based upon the age limit information.

The advertisement distribution server may further include a counting system that counts a number of times the server receives the information indicating the status of the user and/or a number of times the server transmits the advertisement information.

Thus, an advertisement distribution system with the server implemented therein can provide advertisements that are likely to be interesting to the user who receives the advertisements, and effective advertisements are realized. Furthermore, a server system is realized, which has the same functions and effects as the advertisement distribution system as described above.

According to a third aspect of the invention, there is provided a recording medium on which is recorded a program executed by a computer of a server in an advertisement distributing system. The server is connected to multiple terminals via a network. The program causes the computer to receive information indicating a status of a user from a first terminal. The program further causes the computer to detect advertisement information corresponding to the status of the user indicated by the received information in an advertisement information storage that stores the advertisement information based upon the status of the user. The program further causes the computer to transmit the detected advertisement information to a second terminal of another user stored in a user relationship storage as associated with the user of the first terminal.

Furthermore, the detected advertisement information can be transmitted with the information indicating the status of the user.

In one embodiment, receiving the information indicating the status of the user further includes receiving from the user designation information designating the other user to be associated with the user of the first terminal. The program further causes the computer to cause the user relationship storage to store the user in association with the other user based upon the designation information.

Furthermore, the information indicating the status of the user may include information indicating a video game executed by the first terminal of the user.

In another embodiment, the user relationship storage further stores evaluation information of the status of the user. The information indicating the status of the user is transmitted together with the evaluation information.

Furthermore, the advertisement information storage stores multiple pieces of advertisement information together with a priority for each of the pieces of the advertisement information. The advertisement information is transmitted so that the pieces of advertisement information are displayed on the second terminal in a priority order.

The advertisement information storage may store the advertisement information together with expiration date information. In this case, the advertisement information is further detected based upon the expiration date information.

Furthermore, the advertisement information storage may store the advertisement information together with age limit information of the advertisement information. In this case, the advertisement information is further detected based upon the age limit information.

Thus, by causing the computer to execute processing in accordance with the program recorded on the recording medium, a server useful for an advertisement distribution system can be provided which realizes advertisements that are likely to be interesting to the user who receives the advertisement. Furthermore, a server system is realized, which has the same functions and effects as the advertisement distribution system as described above.

According to the present invention, advertisement information is transmitted not to the general public but to a terminal of another user stored in a server while being associated with a certain user. Therefore, the effective distribution improves the effectiveness of the advertisement. Furthermore, advertisement information corresponding to a certain user is displayed to another user who is specified in the relationship with the certain user, and the advertisement information is likely to interest the other user. Thus, effective and efficient advertising is realized.

BRIEF DESCRIPTION OF THE DRAWINGS

FIG. 1 is a view showing an example of a display screen in a conventional network system;

FIG. 2 is a view showing another example of a display screen in the conventional network system;

FIG. 7 is a conceptual diagram showing a structure of an advertisement data table according to an embodiment of the invention;

FIG. 8 is a conceptual diagram showing a structure of a history storage according to an embodiment of the invention;

FIG. 16 is a view showing an example of a status setting display screen according to an embodiment of the invention;

DETAILED DESCRIPTION OF THE PREFERRED EMBODIMENTS

Preferred embodiments of the invention will be explained in detail with reference to the appended drawings.

Figure 3:
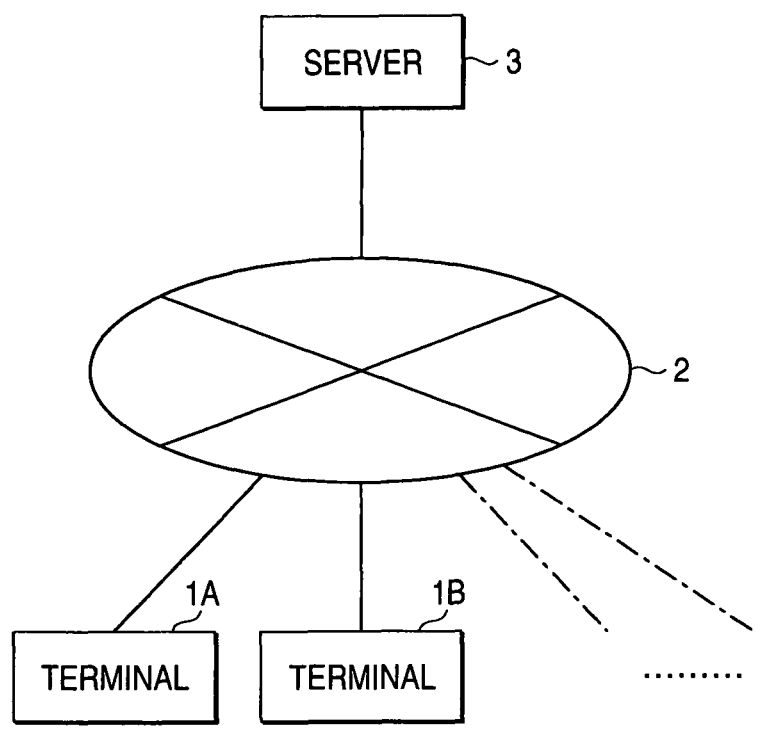
FIG. 3 is a block diagram showing a structure of a network system according to an embodiment of the invention.

FIG. 3 is a block diagram showing a structure of a network system according to an embodiment of the invention. A server 3 and multiple terminals 1A, 1B . . . of users A, B . . . at a client side are connected on the Internet 2. In an embodiment, a video game apparatus constituted of a game machine main body, a television receiver and a operation controller are user as the terminals 1A and 1B. However, they are not limited to this, and a personal computer connected to a communications line, a wireless mobile terminal or any apparatus having a computer that can execute a program may be used. Hereinafter, the terminals 1A, 1B . . . are collectively referred to as a terminal 1.

Figure 4:
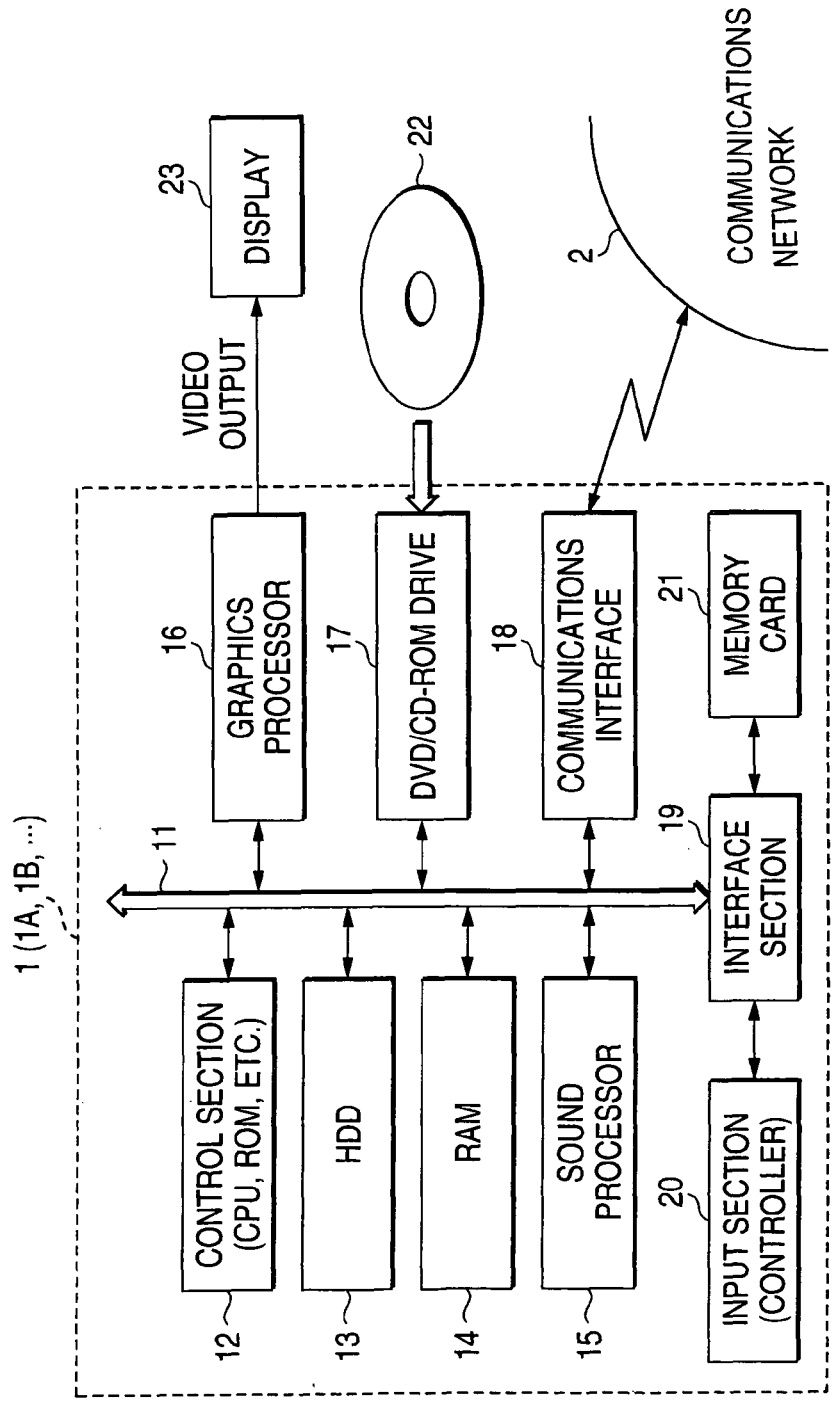
FIG. 4 is a block diagram showing a structure of a terminal according to an embodiment of the invention.

FIG. 4 is a block diagram showing a structure of the terminal 1. As shown in the figure, the terminal 1 is constructed of a control section 12, a hard disk drive (HDD) 13, a random access memory (RAM) 14, a sound processor 15, a graphics processor 16, a DVD/CD-ROM drive 17, a communications interface 18 and an interface section 19. These components are connected with each other via a bus 11.

The control section 12 is constructed to have a central processing unit (CPU), a read only memory (ROM), etc. The control section 12 executes a program stored in the RAM 13 in linear sequence, based upon a basic program such as a boot program stored in the ROM or an operating system (OS), etc., in order to advance a video game. The control section 12 also controls operations of each section in the game machine main body. In the HDD 13, a game program or data loaded from the outside via the communications interface 18 and the Internet 2 are stored.

The RAM 14 serves as a main memory on the game machine and stores a program or data necessary for advancing the game. The program or data are transferred from a DVD/CD-ROM 22. The RAM 13 also serves as a work area when executing the program. The sound processor 15 executes processing for reproducing sound data such as background music (BGM) or sound effects corresponding to the game progress based upon the instruction from the control section 12.

The graphics processor 16 generates various kinds of image data based upon the instruction from the control section 12. The graphics processor 16, for example, executes three-dimensional graphics processing and generates the image data according to the game progress. The graphics processor 16 outputs the generated image data together with a predetermined synchronizing signal to a display apparatus 23 as a video signal.

The DVD/CD-ROM drive 17 drives the CD/CD-ROM 22 set in the game machine main body based upon the instruction from the control section 12, and transfers the program or data stored in the DVD/CD-ROM 22 to the RAM 14 via the bus 11. The communications interface 18 is connected to the outside Internet 2 via a communications line. The communications interface 18 executes processing for sending/receiving the program or data to/from the Internet 2.

An input section (controller) 20 and a memory card 21 are detachably connected to the interface section 19. The interface section 19 controls data transmission between the input section (controller) 20 and the memory card 21 and the control section 12 or the RAM 14. The input section (controller) 20 is provided with various keys or buttons. A user operates these keys or buttons to input an instruction for moving or operating his/her character so that the game advances. The user also operates these keys or buttons to input message data in chatting. Furthermore, in the memory card 21, data indicating the game progress are stored.

The DVD/CD-ROM 22 stores the game program or a program or various kinds of data of the terminals as described below. The DVD/CD-ROM 17 drives the CD/DVD-ROM 22 and reads out the stored program or data. The program or data read out from the DVD/CD-ROM 22 are transferred from the DVD/CD-ROM drive 17 to the RAM 14 via the bus 11.

The display apparatus 23 includes a display screen having a cathode ray tube (CRT) and the like to display the image corresponding to a video signal from the graphics processor 16. A television receiver is normally used as the display apparatus 23.

Figure 5:
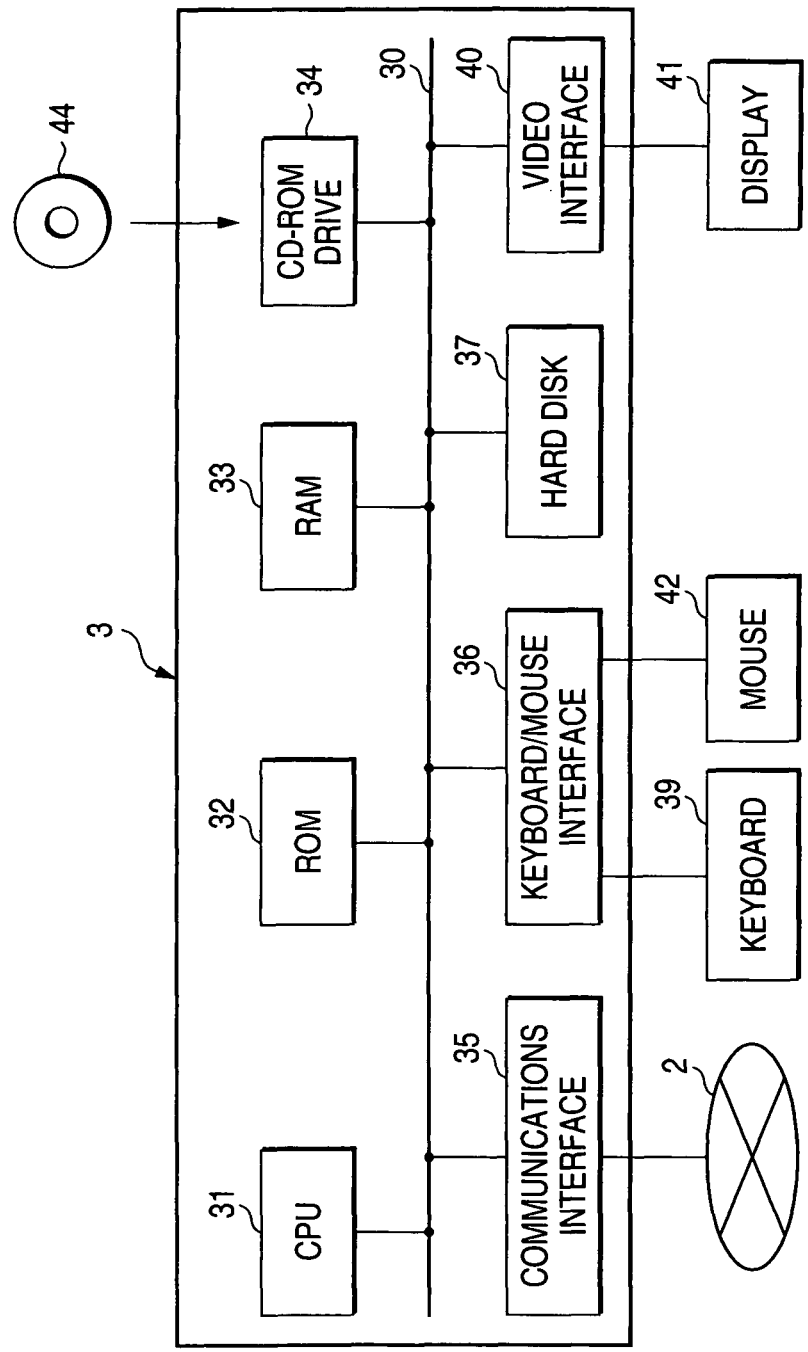
FIG. 5 is a block diagram showing a structure of a server according to an embodiment of the invention.

FIG. 5 is a block diagram showing a structure of the server 3. As shown in the figure, the server 3 includes a CPU 31, a ROM 32, a RAM 33 and a CD-ROM drive 34. The bus 30 connects these components 31-34 with each other. The CPU 31 controls the overall operation. The ROM 32 stores a boot program, etc. The RAM 33 serves as a temporary storage area. The CD-ROM drive 34 drives a CD-ROM 44 storing a program of the server as shown in the flowcharts described below. Furthermore, the bus 30 connects a hard disk 37 storing information described below, a keyboard/mouse interface 36, a video interface 40 connected to a display 41, and a communications interface 35 for connecting to the internet 2. A keyboard 39 and a mouse 42 for inputting commands or characters are connected to the keyboard/mouse interface 36.

Figure 6:
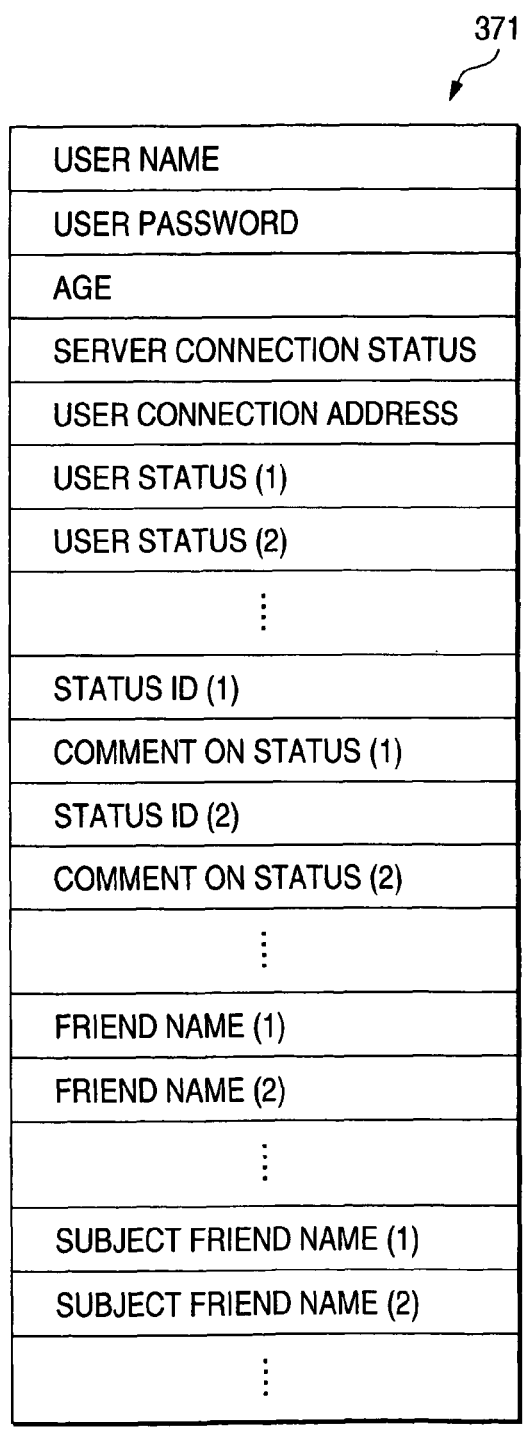
FIG. 6 is a conceptual diagram showing a structure of a profile storage according to an embodiment of the invention.

A profile storage 371 in FIG. 6 is provided to respective users A, B . . . . The profile storage 371 stores a user name, a user password used for connecting to the server 3, an age of the user and a server connection status indicating whether the user is online or offline. The profile storage 371 further stores a user connection address (IP address and port) used for connecting to the terminal of the user. The profile storage 371 further stores user statuses (1), (2) . . . , each of which serves as a status ID indicating a present status of the user. The profile storage 371 further stores comments (1), (2) . . . on the status serving as the user's comment on the status indicated by the status ID. The profile storage 371 further stores friend names (1), (2) . . . serving as the user names of other users whom the user registered as friends. The profile storage 371 stores subject friend names (1), (2) serving as the user names of the other users who registered the user as a friend.

An advertisement data table 372 in FIG. 7 stores a status name, an icon image name, an advertising URL, an age limit, an expiration date and a priority in association with the status ID. The status name includes a name of the online/offline game that the user plays, such as Game A, Game B, etc. The status name may also include a name of the amusement facility where the user currently is, such as "AA Amusement Park", "The Movie CC", etc. The icon image name is a file name of the image that displays the status name by the icon. The image data are separately stored in the hard disk 37. The advertising URL is a URL of the advertisement corresponding to the status name. The age limit indicates an appropriate qualifying age of the advertisement corresponding to the status name. The expiration date indicates an expiration date of the advertisement corresponding to the status name. The priority indicates a priority for displaying the advertisement corresponding to each status. The higher its value is, the higher the priority value is.

A history storage 373 in FIG. 8 stores, for respective users (User A, User B, etc.) information indicating the absence or presence of status setting, status reception and status display in association with the status ID on a monthly basis (August, 2003, September, 2003, etc.). With respect to the absence or presence of the status setting, the value of "1" indicates that the status represented by the corresponding status ID was set. The value of "0" indicates that the status represented by the corresponding status ID was not set. With respect to the absence or presence of the status reception, the value of "1" indicates that the status represented by the corresponding status ID was received. The value of "0" indicates that the status represented by the corresponding status ID was not received. With respect to the absence or presence of the status display, the value of "1" indicates that the advertisement information of the status represented by the corresponding status ID was displayed. The value of "0" indicates that the advertisement information of the status represented by the corresponding status ID was not displayed.

The history storage 373 further stores a total number of status settings for respective statuses, a total number of receptions for respective statuses, and a total number of displays for respective statuses. The total number of status settings indicates the number of the settings made by all of the users. The total number of receptions indicates the number of receptions made by all of the users. The total number of status displays indicates the number of displays made by all of the users.

Figure 9:
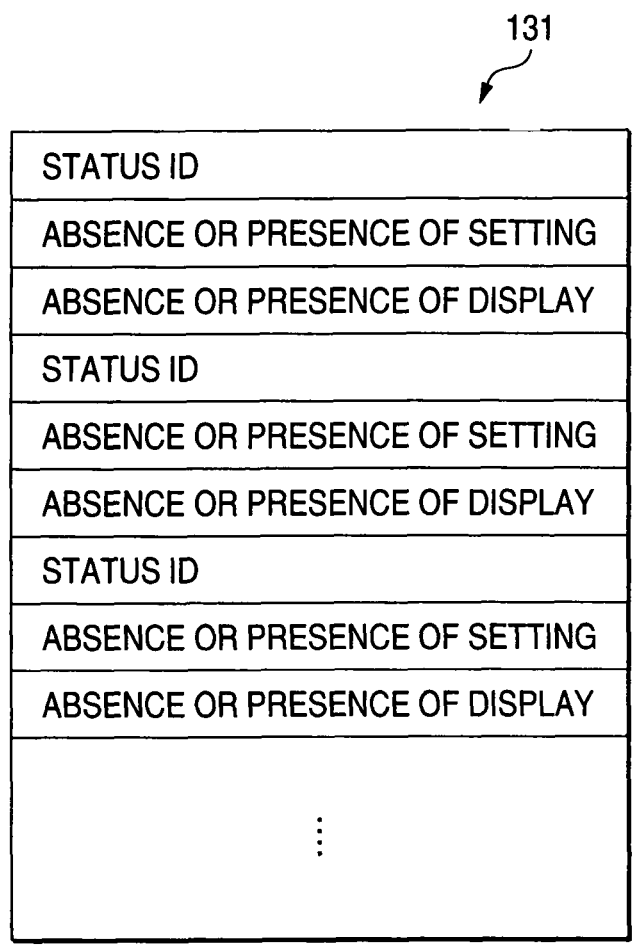
FIG. 9 is a conceptual diagram showing a structure of a management storage according to an embodiment of the invention.

On the other hand, the HDD 13 of the terminal 1 includes a management storage 131 as shown in FIG. 9. The management storage 131 stores, for respective status IDs, absence or presence of settings of the status represented by the corresponding status ID. The management storage 131 further stores absence or presence of displays of the advertisement corresponding to the status represented by the corresponding status ID. These data are expanded on the RAM 14 to be used.

Operations according to the embodiment as described above will be explained with reference to flowcharts of FIGS. 10-15.

Figure 10:
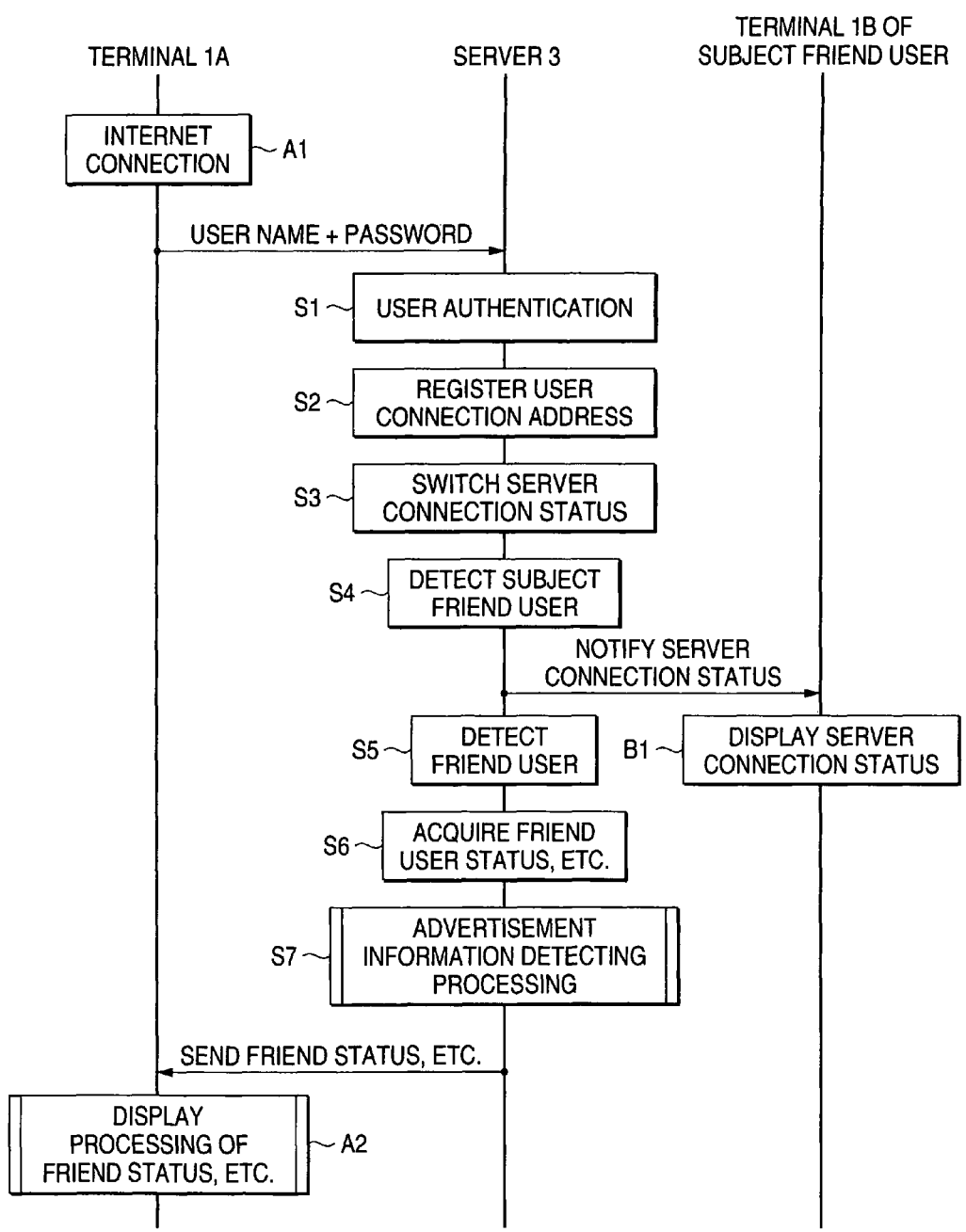
FIG. 10 is a flowchart showing a processing procedure for connecting a terminal to a sever according to an embodiment of the invention.

FIG. 10 is a flowchart showing a processing procedure for connecting the terminal 1A, for example, to the server 3. The terminal 1A executes Internet connection processing (step A1) in response to the user A's operation with the input section 20. Then, the terminal 1 sends the user name, the password, the IP address and the like to the server 3 via the Internet 2.

The server 3 executes a user authentication processing based upon the user name and the password sent from the terminal 1A (step S1), and registers a user connection address in a region of the user A in the profile storage 371 (step S2). In addition, the server 3 switches the server connection status (FIG. 6) in the region of the user A in the profile server 371 from offline to online (step S3). Then, the server 3 detects the user who registered the user A as a friend (the subject user name) stored in the region of the user A in the profile storage 371 (step S4) to notify the subject user with the server connection status of the user A. Consequently, in the case where the name of the user B is registered as the subject friend name in the region of the user A in the profile storage 371, the terminal 1B of the user B is notified of the terminal connection status (switch from offline to online). Upon receiving the notification, the terminal 1B displays the server connection status of the user A (step B1).

On the other hand, the server 3 detects a friend user (friend name) registered in the region of the user A in the profile storage 371 (step S5). Then, the server 3 acquires the server connection status and the like of the friend user (step S6). That is, in the case where the name of a user C is registered as the friend name in the region of the user A in the profile storage 371, the server 3 acquires the server connection status, the user status and the like from the region of the user C in the profile server 371. Then, the server executes an advertisement information detecting processing (step S7), which will be explained in detail below. Then, the server sends a friend status, etc., including the server connection status, the user status and the advertising URL to the terminal 1A. Upon receiving the friend status, the terminal 1A executes a display processing of the friend status, etc. (step A2), which will be explained in detail below.

Figure 11:
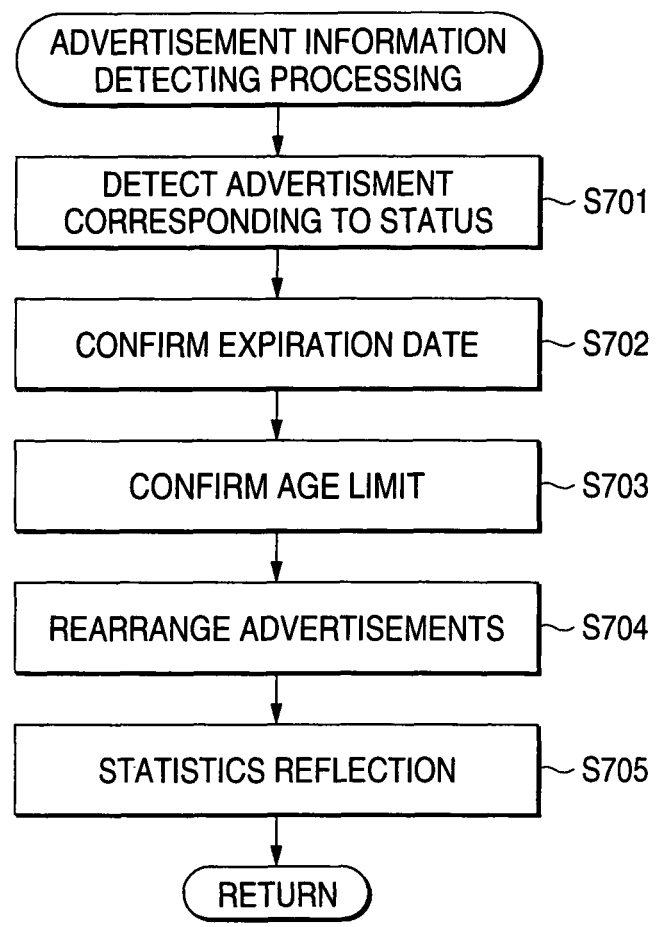
FIG. 11 is a flowchart showing a detail of advertisement information detecting processing according to an embodiment of the invention.

FIG. 11 is a flowchart showing a detail of the advertisement information detecting processing (step S7), Firstly, the advertisement information corresponding to the user status is detected in the advertisement data table 372 of FIG. 7 (step S701). That is, in the case where the acquired user status is the Game A corresponding to the status ID 0001, the icon image name, the advertisement URL, the age limit, the expiration date and the priority of the game A are detected. Then, the server 3 confirms the expiration date (step 702). Then, the server 3 compares the age of the user to whom the advertisement information is to be sent with the age limit (step S703). Thus, the server 3 decides whether to send the advertisement.

In addition, the server 3 rearranges the advertisements according to the priority (step S704). That is, as the priorities of the Games A, B and C are "100", "1000" and "150", respectively, the display order of the corresponding icon images is set to "Game B", "Game C" and "Game A". Furthermore, the server executes a statistics reflection processing (step S705) to update the total number of the status setting in the history storage 373 of FIG. 8.

Figure 12:
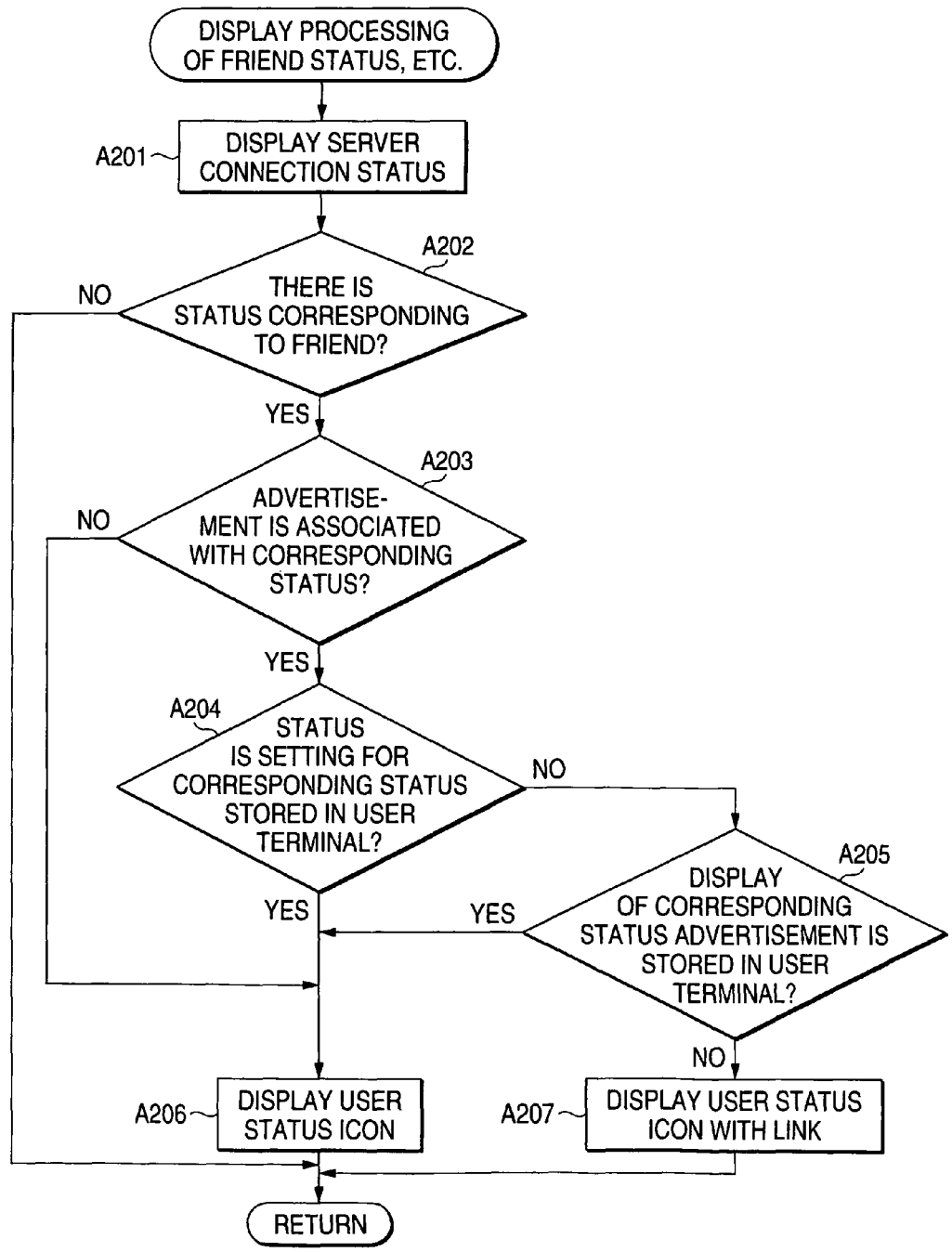
FIG. 12 is a flowchart showing a detail of display processing of a friend status, etc., according to an embodiment of the invention.

FIG. 12 is a flowchart showing a detail of the display processing of the friend status, etc. (step A2). The processing shown in this flowchart is repeatedly executed for each of the friends. First, the terminal 1A displays the server connection status (step A201), that is, displays the information indicating whether the friend is online or offline. Next, the terminal 1A determines whether there is the status corresponding to the friend (the other user indicated by the friend name in the profile storage 371) (step A202). When there is the corresponding status, the terminal 1A determines whether the advertisement is associated with the corresponding status (step A203). In other words, the server confirms the expiration date and the age limit (steps S702 and S703) to decide whether to send the advertisement in the flowchart of FIG. 11 as described above, and, there may be a case where the terminal 1A does not receive the advertisement corresponding to the status from the server 3. Accordingly, at step S202, the terminal 1A determines whether the advertisement is associated with the status of the friend. When there is no advertisement corresponding to the friend status, the terminal 1A displays the icon of the user status with no link (step A206).

When the advertisement is associated with the friend status, the terminal 1A determines whether the status setting corresponding to the status has been made before in the terminal 1A (step A204). In other words, the management storage stores, for respective status IDs, the absence or the presence of the settings of the status represented by the status ID as described above. In the case where the user A has made the setting of the Game A before, the presence of the setting is stored for the status ID representing the Game A. For such a user who has previously had a status setting corresponding to the Game A, it is not effective to display the advertisement for the Game A again. Accordingly, when it is determined that the corresponding status setting has been occurred before (step A205; YES), the terminal 1A displays the icon of the user status with no link (step A206).

In the case where the terminal 1A has not had the status setting (step A204; NO) before, it is determined whether the terminal 1A has displayed the advertisement corresponding to the friend status before (step A205). In other words, the management storage stores, for respective status IDs, the absence or presence of the display of the advertisement corresponding to the status represented by the status ID. In the case where the terminal of the user A has displayed the advertisement of the Game A before, the presence of the advertisement is stored for the status ID representing the Game A. It is not effective to display the advertisement for the Game A to the user who has already viewed the advertisement for Game A. Accordingly, when the advertisement has been displayed before (step A205; YES), the terminal 1A displays the icon of the user status with no link (step A206). When the advertisement has not been displayed before (step A205; NO), the terminal 1A displays the icon of the user status along with the link (step A207).

Figure 13:
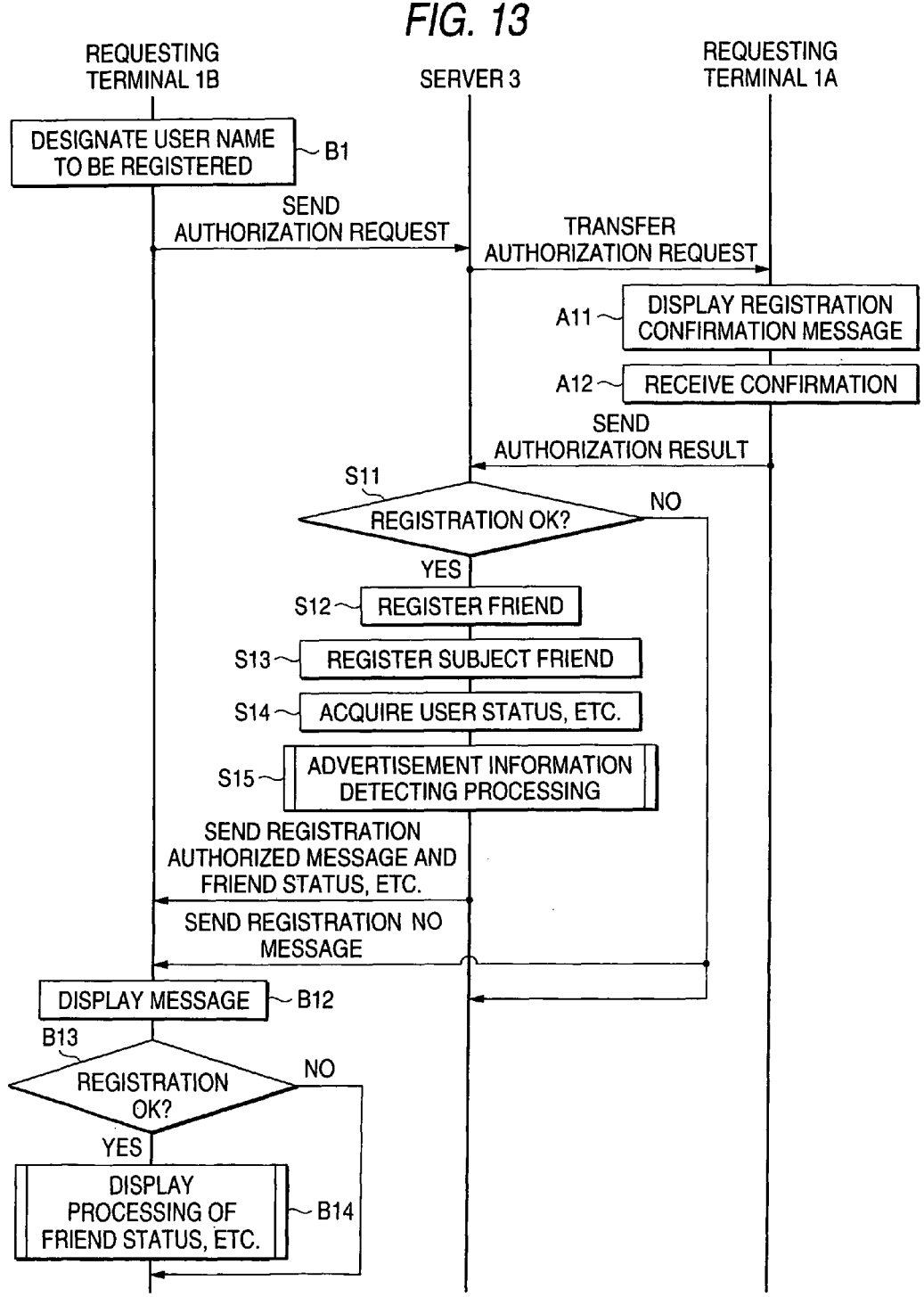
FIG. 13 is a flowchart showing a processing procedure of a user for registering another user as a friend according to an embodiment of the invention.

FIG. 13 is a flowchart showing a processing procedure of the case where the user B registers the user A as the friend, for example. The terminal 1B of the user B designates the user name (the userA, in this case) input by the user B with the input section 20 (step B11). Then, the terminal 1B sends an authorization request to the server 3 together with the designated user name (the user A). The server 3 transfers the authorization request to the terminal 1A of the user A. The terminal 1A displays a registration confirmation message ("User B wants to register you as a friend", for example) in response to the authorization request (step A11). Then, the terminal 1A executes a confirmation reception processing (step A12) to receive a confirmation result indicating whether the registration is authorized or not based upon the user A's operation with the input section 20. Then, the terminal 1A sends the confirmation result to the server 3.

The server 3 judges whether the registration is authorized or not (step S11). When the confirmation result indicates that the registration is authorized (step S11; YES), the server 3 stores the user A as the friend name in the region of the user B in the profile storage 371 of FIG. 6 (step S12). In addition, the server 3 stores the user B as the subject friend name in the region of the user A in the profile server storage 371 (step S13). Thus, the user B is registered as the subject friend in the region of the user A in the profile storage 371 as described above.

Then, the server 3 acquires the user status and the like of the user A registered as the friend at step S12 (step S14), and executes the advertisement information detecting processing as described above with reference to FIG. 11 (step S15). Then, the server 3 sends a registration authorization message to the terminal 1B together with the friend status (the user status of the user A) acquired at step S15. When the confirmation result indicates that the registration is not authorized (step S11; NO), the server 3 sends a registration disapproval message to the terminal 1B of the user B. The terminal 1B displays the message sent from the server 3 (step B12), and judges whether the message is the registration authorization message or the registration disapproval message (step B13). When the message is the registration authorization message (step B13; YES), the friend status and the like of the user A is sent from the server 3 as described above. Accordingly, the terminal 1B executes the display processing of the friend status, etc., as described above with reference to FIG. 12 (step B14).

Figure 14:
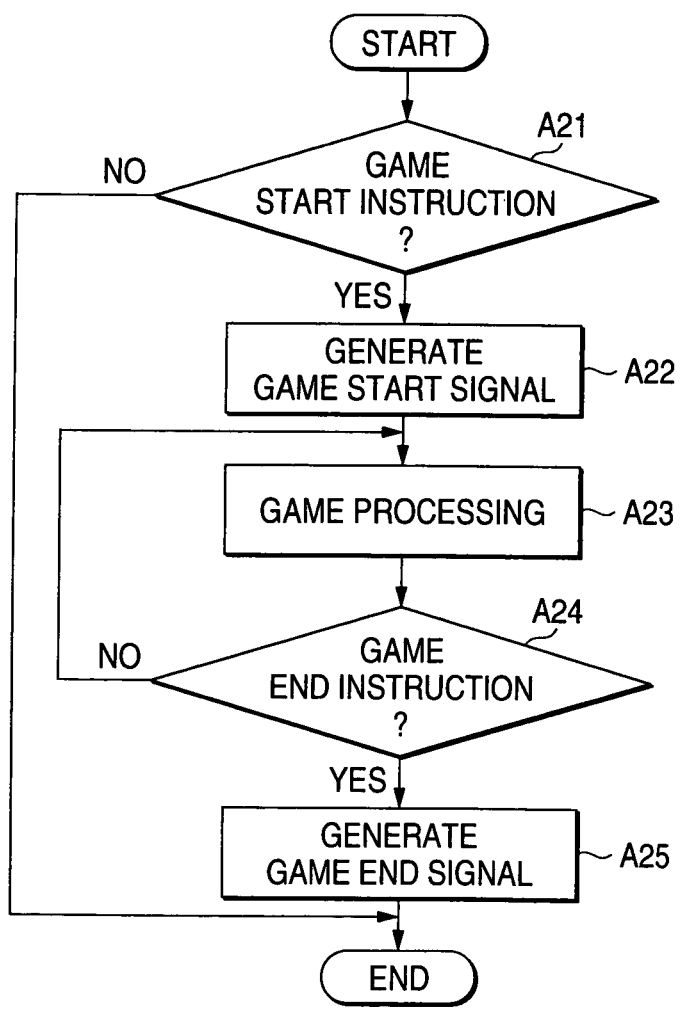
FIG. 14 is a flowchart showing a processing procedure of a game program executed by a terminal according to an embodiment of the invention.

FIG. 14 is a flowchart showing a processing procedure of a game program executed by the terminal 1. The terminal 1 notifies the server 3 of the status of the game program during the processing. In the case where the terminal 1A executes the Game A, for example, the terminal 1A judges whether a game start instruction has been made in accordance with the game program of the Game A (step A21). When it is judged that the game start instruction has been made (YES), the terminal 1A generates a game start signal (step A22). Then, the terminal 1A executes a game processing (step A23). During the game processing, the terminal 1A constantly judges whether a game end instruction is made (step A24). When it is judged that the game end instruction has been made, the terminal 1A generates a game end signal (step A25).

Thus, the terminal 1A is able to notify the server 3 of its own status by effectively using the game program.

Figure 15:
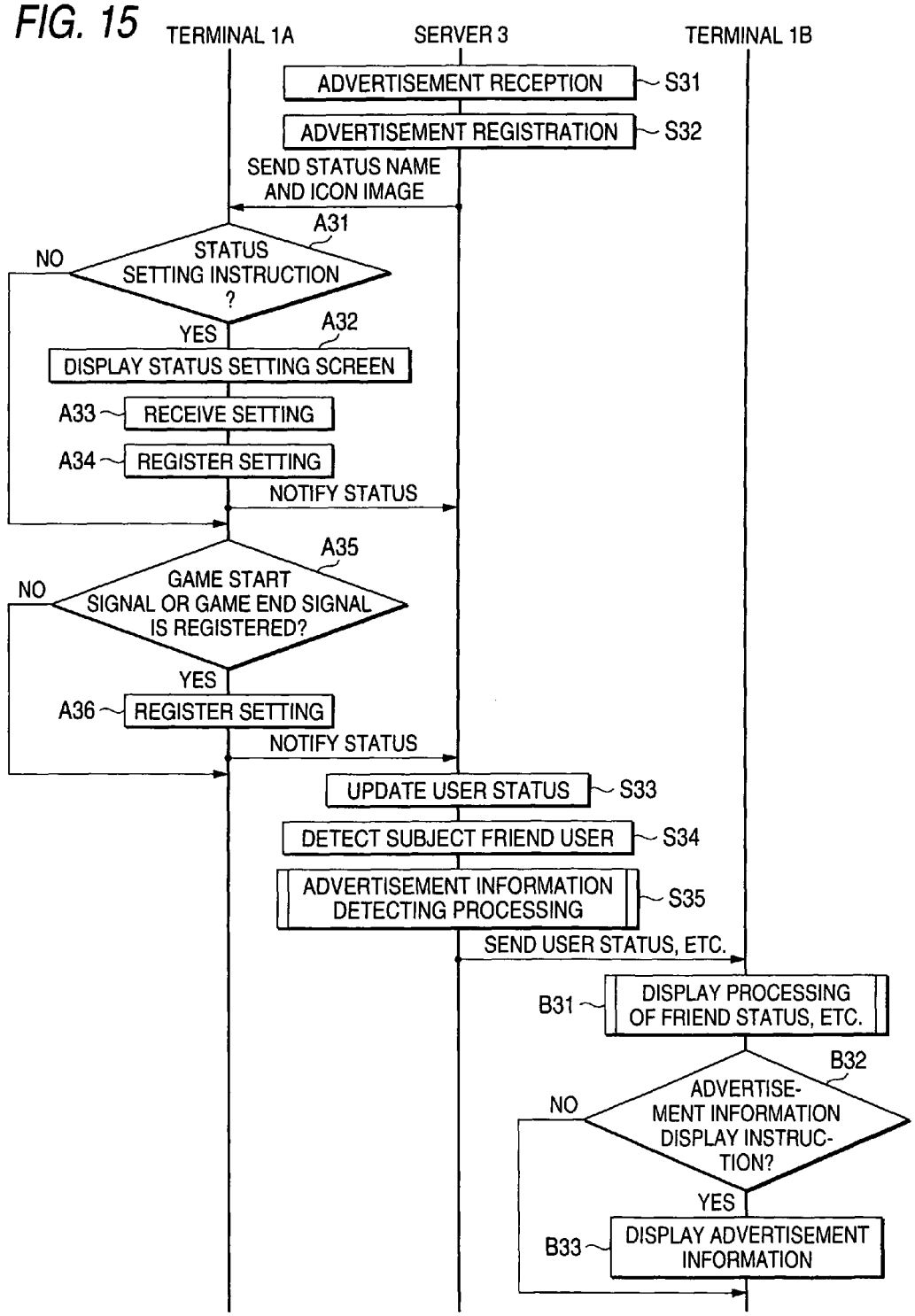
FIG. 15 is a flowchart showing a processing procedure among a terminal of each user, a server and a terminal of a friend user according to an embodiment of the invention.

FIG. 15 is a flowchart showing a procedure of processing executed among the terminals of respective users (the terminal 1A of the user A, in this example), the server 3 and the terminals of respective subject users (terminal 1B of the user B, in this example). First, the server 3 receives an advertisement application from the terminal serving as an advertiser (step S31). Then, the server 3 executes an advertisement registration processing (step S32). That is, the server 3 stores, in the advertisement data table 372 of the FIG. 7, the status name, the icon image name, the advertising URL, the age limit, the expiration date and the priority in association with the status ID based upon information sent from the terminal serving as the advertiser. When the various kinds of information are stored in association with the status ID as above, the server 3 sends the status name in association with the icon image to the terminal 1A.

Then, the terminal 1A judges whether the status setting instruction is made by the user A with the input section 20 (step A31). When it is judged that the status setting instruction is not made, the processing proceeds to step A35, which will be explained below. When it is judged that the status setting instruction is made, the terminal 1A displays a status setting screen (step A32). At step A32, the display apparatus 23 of the terminal 1A displays the status setting screen as shown in FIG. 16. Here, as explained with reference to step S704 in the flowchart of FIG. 11, the server 3 rearranges the advertisements according to the priority before sending the status names in association with the icon images, etc. Accordingly, the status names are also displayed on the status setting screen while being arranged according to the priority. That is, the higher the priority is, the higher the corresponding status name is displayed on the screen.

When the user A executes an operation for setting any one of the status names with the input section 20, while the status setting screen is displayed on the display apparatus 23, the terminal 1A executes a setting reception processing for receiving the setting operation (step A33). Then, the terminal 1A registers the presence of the setting in the region of the absence or presence of the setting for the received status in the management storage 131 (step A34). Then, the terminal 1A notifies the server 3 of the status that the terminal 1A has set.

On the other hand, as explained with reference to the flowchart of FIG. 14, when the user A plays a video game with the terminal 1A, the terminal 1A generates the game start signal in response to the game start instruction (step A22), and generates the game end signal in response to the game end instruction (step A25) by the processing of the game program. Accordingly, at step A35 in the flowchart of FIG. 15, the terminal 1A judges whether the game start signal or the game end signal is generated. When the game start signal or the game end signal is generated, the terminal 1A registers the presence of the setting in the region of the absence or presence of the setting corresponding to the video game (step A36). Then, the terminal 1A notifies the server 3 of the status, that is, the start or the end of the video game.

Upon receiving notice of the start or the end of the video game, the server 3 updates the corresponding user status in the user statuses (1), (2) . . . , each of which serves as a status ID indicating the present status of the user, in the region of the user A in the profile storage 371 (step S33). Then, the server 3 detects the friend user registered as the subject friend in the region of the user A in the profile storage 371 (step S34). Then, the server 3 executes the advertisement information detecting processing as described above (step S35). Because the friend B is registered as the subject friend of the user B as an example in this embodiment, the server 3 sends the user status of the user A and the advertisement information (an advertising URL, etc., for example) to the terminal 1B of the user B.

Figure 17A:
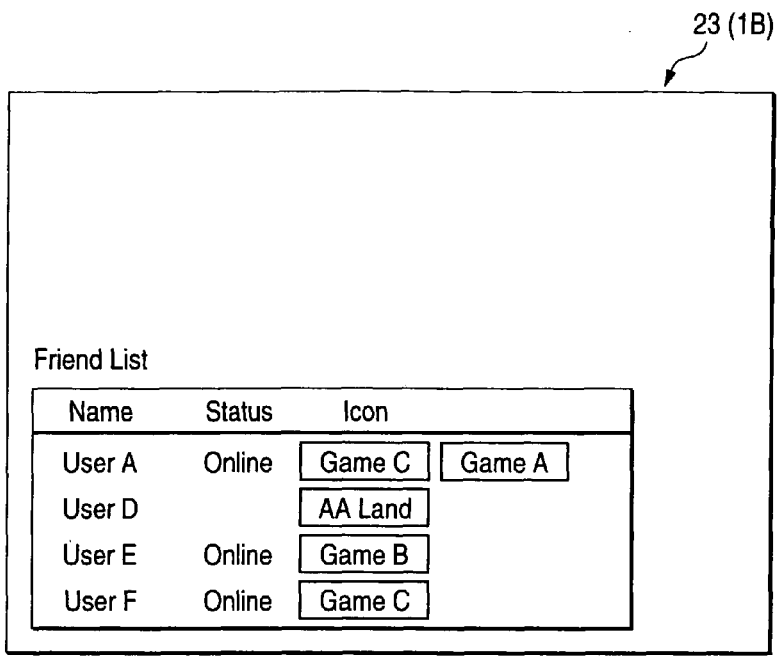
FIG. 17A is a view showing an example of a normal display screen of a terminal according to an embodiment of the invention.

The terminal 1B of the user B receives the user status from the server 3, and executes the display processing of the friend status, etc. (step B31). The display processing of the friend status, etc., at step B31, is processed in accordance with the flowchart of FIG. 12 as described above. Thus, the screen shown in FIG. 17A is displayed on the display apparatus 23 of the terminal 1B. As shown in FIG. 17A, the user B also registers the users D, E and F as friends in addition to the user A, and the statuses of the other users D, E, F are also processed in the same way as the user A.

Figure 17B:
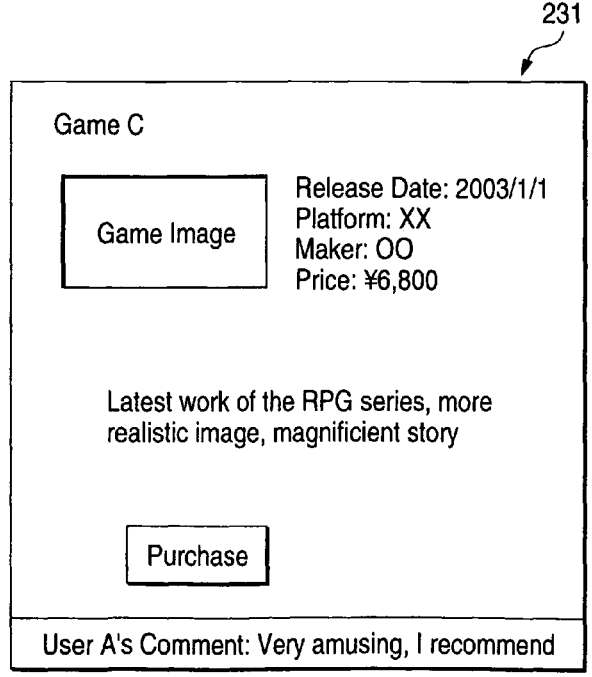
FIG. 17B is a view showing an example of an advertisement information display screen according to an embodiment of the invention.

When the user B instructs the display of the advertisement information by clicking the icon of the Game C associated with the user A with the input section 20 in the screen shown in FIG. 17A (step B32; YES), the terminal 1B executes the advertisement information display processing for displaying the advertisement based upon the advertising URL linked with the icon of the Game C (step B33). As a result of the processing at step B33, an advertisement information screen 231 shown in FIG. 17B is displayed on a part of the display apparatus 23 of the terminal 1B. On the advertisement information screen, the related information of the Game C, such as its image graphics and/or price and the like, advertising slogans and/or a purchase button are displayed. Here, the advertisement relating to the Game C, which is the status of the user A whom the user B registered as a friend is likely to be of interest to the user B. Thus, increased advertising effectiveness should be expected. Furthermore, when the user clicks the purchase button, a screen for purchasing the corresponding game is displayed, and the user can easily purchase the game.

Furthermore, on the advertisement information screen 231, a comment of the user A whom the user B registered as a friend is displayed. This comment is based on information registered in the region of user A in the profile storage 371 as the comments on the status. This comment of user A, who is registered as a friend, drives the user B to buy the Game C. Thus, increased advertising effectiveness is realized.

Although the server 3 stores the advertising URL and sends it to the terminal 1 in this embodiment, the server 3 may store a file storing the advertisement content and send it to the terminal 1. That is, any structure may be used in which the server 3 stores the advertising content or information via which the user can reach the advertising content, and sends the information to the terminal 1.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An advertisement distributing system having a server computer and a plurality of terminals connected to the server computer via a network, wherein:

a first terminal comprises:
   a first receiver that receives evaluation information from a first user that executes a video game and that exists in an amusement facility, the evaluation information including a comment of the first user on the video game and the amusement facility;
   a terminal detector that generates status information of the first user using the video game, the status information including a name of the video game that the first user executes and a name of the amusement facility;
   a first transmitter that transmits the status information generated by the terminal detector and the evaluation information received by the receiver, the server computer comprises:
   a user relationship storage including the status information of the first user, the evaluation information of the video game and the amusement facility, and associated information of a second user in association with the first user;
   an advertisement information storage including advertisement information that corresponds to the name of the video game and the amusement facility;
   a second receiver that receives the status information of the first user and the evaluation information of the video game and the amusement facility from the first terminal;
   a first detector that detects, in the advertisement information storage, the advertisement information corresponding to the name of the video game and the amusement facility included in the received status information of the first user;
   a second detector that detects, in the user relationship storage, the evaluation information corresponding to the advertisement information that the first detector detects; and
   a second transmitter that transmits the detected advertisement information, the detected evaluation information, and the status information of the first user to a second terminal of the second user based on the association information included in the user relationship storage, the second terminal of the second user comprises:
   a third receiver that receives the status information, the advertisement information, and the evaluation information from the server computer;
   an advertisement execution information storage including executed advertisement information that has been executed by the second terminal; and
   a displayer that displays the status information of the first user on the second terminal of the second user, the advertisement information and the evaluation information being associated with the status information when the advertisement information is not stored as the executed advertisement information in the advertisement execution information storage, and displays the advertisement information and the evaluation information when the advertisement information and the evaluation information are associated with the status information and when the status information that is displayed on the second terminal is selected by the second user of the second terminal, and wherein the amusement facility is a physical location.

2. The advertisement distributing system according to claim 1,
   wherein the second transmitter transmits the status information of the first user together with the advertisement information,
   the third receiver receives the status information of the first user together with the advertisement information, and
   the displayer displays the advertisement information together with the status information of the first user.

3. The advertisement distributing system according to claim 2,
wherein the first transmitter further transmits designation information designating the associated second user,
the second receiver further receives the designation information, and
the user relationship storage includes the information of the first user in association with the second user based upon the designation information.

4. The advertisement distribution system according to claim 1,
wherein the user relationship storage includes the information of the first user in association with a plurality of second users, and
the second transmitter transmits to a terminal of each of the plurality of second users included in the user relationship storage and associated with the first terminal.

5. The advertisement distribution system according to claim 2,
wherein the status information of the first user comprises a connection status of the first terminal of the first user.

6. The advertisement distribution system according to claim 2,
wherein the terminal detector detects an execution status of the video game executed by the first terminal of the first user
as the status information of the first user.

7. The advertisement distribution system according to claim 1, wherein the user relationship storage further includes evaluation information of the status information of the first user.

8. The advertisement distribution system according to claim 2,
wherein the advertisement information storage includes a plurality of pieces of the advertisement information together with a priority for each of the plurality of pieces of the advertisement information, and
the second transmitter transmits the advertisement information so that the plurality of pieces of the advertisement information are displayed on the second terminal in an order based on the priority of each of the plurality of pieces of the advertisement information.

9. The advertisement distribution system according to claim 2,
wherein the first terminal further comprises a designator that designates the status of the first user, and
the first transmitter transmits the status of the first user as designated by the designator.

10. The advertisement distribution system according to claim 9,
wherein the second receiver receives the designated status of the first user from the first transmitter,
the second transmitter transmits the designated status of the first user,
the third receiver receives the designated status of the first user,
the displayer displays the designated status received by the third receiver, and
the second terminal of the second user further comprises a selector that selects any one of the statuses of the first user displayed by the displayer.

11. The advertisement distributing system according to claim 1,
wherein the terminal detector detects at least one of a start and an end of the video game executed by the first terminal
as the status information of the first user.

12. The advertisement distributing system according to claim 1,
wherein the server computer further comprises a processor that executes a user authentication process for authenticating the second user of the second terminal, and that registers a user connection address of the second terminal in the user relationship storage, and
the second transmitter transmits the detected advertisement information, the detected evaluation information, and the status information of the first user to the second terminal of the second user based on the user connection address during an authenticated user session of the second user of the second terminal.

13. The advertisement distributing system according to claim 1,
wherein the advertisement information storage includes the advertisement information together with age limit information of the advertisement information, and
the first detector of the server computer further detects the advertisement information based upon the age limit information.

14. The advertisement distributing system according to claim 1, wherein the server computer further comprises a counter that counts at least one of a number of times the server computer receives the information indicating the status of the first user and a number of times the server computer transmits the advertisement information.

15. An advertisement distributing server computer used in an advertisement distributing system, the server computer being connected to a first terminal and a second terminal via a network, comprising:
a user relationship storage including evaluation information received from a first user that executes a video game and that exists in an amusement facility, status information of the first user generated by the first terminal using the video game, and association information of a second user associated with the first user, the evaluation information including a comment of the first user on the video game and the amusement facility, the status information including a name of the video game that the first user executes and a name of the amusement facility;
an advertisement information storage including advertisement information that corresponds to the name of the video game and the amusement facility included in the status information of the first user;
a receiver that receives the status information of the first user and the evaluation information of the video game and the amusement facility from the first terminal;
a first detector that detects, in the advertisement information storage, the advertisement information corresponding to the name of the video game and the amusement facility included in the received status information of the first user;
a second detector that detects, in the user relationship storage, the evaluation information corresponding to the advertisement information that the first detector detects; and
a transmitter that transmits the detected advertisement information, the detected evaluation information, and the status information of the first user to the second terminal of the second user based on the association information included in the user relationship storage,
wherein the status information is displayed on the second terminal of the second user, the advertisement information and the evaluation information are associated with the displayed status information when the second terminal has not executed the advertisement information, and the advertisement information and the evaluation information are displayed on the second terminal of the second user when the advertisement information and the evaluation information are associated with the status information and when the status information that is displayed on the second terminal is selected by the second user of the second terminal, and the amusement facility is a physical location.

16. The advertisement distributing server computer according to claim 15, wherein the transmitter transmits the status information of the first user together with the advertisement information.

17. The advertisement distributing server computer according to claim 16, wherein the receiver further receives designation information designating the second user to be associated with the first user from the first terminal, and the user relationship storage includes the information of the first user in association with the second user based upon the designation information.

18. The advertisement distributing server computer according to claim 15, wherein the user relationship storage includes the association information of the first user in association with a plurality of second users, and the transmitter transmits to a terminal of each of the plurality of second users included in the user relationship storage and associated with the first terminal.

19. The advertisement distributing server computer according to claim 16, wherein the status information of the first user comprises a connection status of the first terminal of the first user.

20. The advertisement distributing server computer according to claim 16, wherein the user relationship storage further includes evaluation information of the status of the first user.

21. The advertisement distributing server computer according to claim 16, wherein the advertisement information storage includes a plurality of pieces of the advertisement information together with a priority for each of the plurality of pieces of the advertisement information, and the transmitter transmits the advertisement information so that the plurality of pieces of the advertisement information are displayed on the second terminal in an order of the priority.

22. The advertisement distribution server computer according to claim 15, further comprising:

a processor that executes a user authentication process for authenticating the second user of the second terminal, and that registers a user connection address of the second terminal in the user relationship storage, wherein the transmitter transmits the detected advertisement information, the detected evaluation information, and the status information of the first user to the second terminal of the second user based on the user connection address during an authenticated user session of the second user of the second terminal.

23. The advertisement distribution server computer according to claim 15, wherein the advertisement information storage includes the advertisement information together with age limit information of the advertisement information, and the first detector further detects the advertisement information based upon the age limit information.

24. The advertisement distribution server computer according to claim 15, further comprising a counter that counts at least one of a number of times the server computer receives the status information of the first user and a number of times the server computer transmits the advertisement information.

25. A non-transitory recording medium on which a program is recorded, the program being executed by a computer of a server in an advertisement distributing system, the server being connected to a first terminal and a second terminal via a network, the program causing the computer to execute:

storing, in a user relationship storage, evaluation information received from a first user that executes a video game and that exists in an amusement facility, status information of the first user generated by the first terminal using the video game and association information of a second user associated with the first user, the evaluation information including a comment of the first user on the video game and the amusement facility, the status information including a name of the video game that the first user executes and a name of the amusement facility;

storing, in an advertisement information storage, advertisement information that corresponds to the name of the video game and the amusement facility included in the status information of the first user;

receiving the status information of the first user and the evaluation information of the video game and the amusement facility from the first terminal;

detecting, in the advertisement information storage, the advertisement information corresponding to the name of the video game and the amusement facility included in the received status information of the first user, detecting, in the user relationship storage, the evaluation information corresponding to the detected advertisement information; and transmitting the detected advertisement information, the detected evaluation information, and the status information of the first user to the second terminal of the second user based on the associated information stored in the user relationship storage, wherein the status information is displayed on the second terminal of the second user, the advertisement information and the evaluation information are associated with the displayed status information when the second terminal has not executed the advertisement information, and the advertisement information and the evaluation information are displayed on the second terminal of the second user when the advertisement information and the evaluation information are associated with the status information and when the status information that is displayed on the second terminal is selected by the second user of the second terminal, and the amusement facility is a physical location.

26. The recording medium according to claim 25, wherein the detected advertisement information is transmitted with the status information of the first user.

27. The recording medium according to claim 26, wherein the program further causes the computer to execute:

receiving designation information designating the second user to be associated with the first user of the first terminal from the first user, and the user relationship storage stores the information of the first user in association with the second user based upon the designation information.

28. The recording medium according to claim 26, wherein the status information of the first user comprises a connection status of the first terminal of the first user.

29. The recording medium according to claim 25, wherein the user relationship storage further stores evaluation information of the status of the first user.

30. The recording medium according to claim 26,
wherein the advertisement information storage stores a plurality of pieces of the advertisement information together with a priority for each of the plurality of pieces of the advertisement information, and
the advertisement information is transmitted so that the plurality of pieces of the advertisement information are displayed on the second terminal in an order based on the priority of each of the plurality of pieces of the advertisement information.

31. The recording medium according to claim 25,
wherein the advertisement information storage stores the advertisement information together with expiration date information, and
the advertisement information is further detected based upon the expiration date information.

32. The recording medium according to claim 25, the program further causing the computer to execute:
user authentication processing, by a processor, for authenticating the second user of the second terminal; and
registering, by the processor, a user connection address of the second terminal in the user relationship storage,
wherein the detected advertisement information, the detected evaluation information, and the status information of the first user is transmitted to the second terminal of the second user based on the user connection address during an authenticated user session of the second user of the second terminal.

* * * * *